(12) United States Patent
Kim et al.

(10) Patent No.: US 9,385,361 B2
(45) Date of Patent: Jul. 5, 2016

(54) RECHARGEABLE BATTERY

(71) Applicant: Samsung SDI Co., Ltd., Yongin-si, Gyeonggi-do (KR)

(72) Inventors: Ik-Kyu Kim, Yongin-si (KR); Seok-Joon Yoon, Yongin-si (KR)

(73) Assignee: Samsung SDI Co., Ltd., Gyeonggi-do (KR)

( * ) Notice: Subject to any disclaimer, the term of this patent is extended or adjusted under 35 U.S.C. 154(b) by 478 days.

(21) Appl. No.: 14/029,668

(22) Filed: Sep. 17, 2013

(65) Prior Publication Data

US 2014/0186692 A1 Jul. 3, 2014

(30) Foreign Application Priority Data

Jan. 3, 2013 (KR) .......................... 10-2013-0000675

(51) Int. Cl.
| | |
|---|---|
| *H01M 2/08* | (2006.01) |
| *H01M 2/26* | (2006.01) |
| *H01M 2/04* | (2006.01) |
| *H01M 10/04* | (2006.01) |
| *H01M 2/02* | (2006.01) |

(52) U.S. Cl.
CPC ............ *H01M 2/263* (2013.01); *H01M 2/0413* (2013.01); *H01M 10/0422* (2013.01); *H01M 10/0431* (2013.01); *H01M 2/022* (2013.01)

(58) Field of Classification Search
None
See application file for complete search history.

(56) References Cited

U.S. PATENT DOCUMENTS

| | | |
|---|---|---|
| 2006/0216588 A1 | 9/2006 | Kim et al. |
| 2009/0233157 A1 | 9/2009 | Kim |
| 2011/0104549 A1* | 5/2011 | Kim ............... H01M 2/027 429/128 |
| 2011/0129708 A1 | 6/2011 | Doo |
| 2011/0183164 A1 | 7/2011 | Wu et al. |

FOREIGN PATENT DOCUMENTS

| | | |
|---|---|---|
| JP | 11-067189 A | 3/1999 |
| JP | 2000-182592 A | 6/2000 |
| JP | 2004-031263 A | 1/2004 |
| JP | 2008-135263 A | 6/2008 |
| KR | 10-2006-0097481 A | 9/2006 |
| KR | 10-2009-0099273 A | 9/2009 |

OTHER PUBLICATIONS

Extended European Search Report dated Apr. 23, 2014 for European Patent Application No. EP 13 199 726.4 which shares priority of Korean Patent Application No. KR 10-2013-0000675 with captioned U.S. Appl. No. 14/029,668.

* cited by examiner

*Primary Examiner* — Cynthia K Walls
(74) *Attorney, Agent, or Firm* — Knobbe, Martens, Olson & Bear, LLP

(57) ABSTRACT

A rechargeable battery is disclosed. In one aspect, the battery includes an electrode assembly having an uncoated region, a case accommodating the electrode assembly therein and an insulation plate disposed on the uncoated region of the electrode assembly. The battery also includes a gasket formed on the insulation plate, wherein the gasket comprises a support supported by and contacting an upper surface of the insulation plate, wherein the support comprises an inner side surface and an outer side surface, and wherein at least one of the inner and outer side surfaces forms an obtuse angle with respect to the upper surface of the insulation plate. The battery further includes a cap assembly contacting the gasket and connected to the uncoated region of the electrode assembly through a lead tab.

20 Claims, 4 Drawing Sheets

RECHARGEABLE BATTERY

RELATED APPLICATIONS

This application claims priority to and the benefit of Korean Patent Application No. 10-2013-0000675 filed in the Korean Intellectual Property Office on Jan. 3, 2013, the entire contents of which are incorporated herein by reference.

BACKGROUND

1. Field

The described technology generally relates to a rechargeable battery having an installation space for a lead tab between an electrode assembly and a cap assembly.

2. Description of the Related Technology

Demand for rechargeable batteries as an energy source increases according to technical developments for mobile devices. As an example of this type of battery, a cylindrical rechargeable battery includes an electrode assembly formed by spirally winding electrodes disposed in both sides of a separator and the separator together in the shape of a jelly roll, a center pin disposed in a hollow portion in the center of the electrode assembly, a case installing the electrode assembly therein, and a cap assembly closing and sealing an opened side of the case.

SUMMARY

One inventive aspect is a rechargeable battery that can prevent movement of an electrode assembly while assuring an installation space of a lead tab.

Another aspect is a rechargeable battery which includes: an electrode assembly; a case installing the electrode assembly therein; a cap assembly coupled to an opening of the case by providing a gasket therebetween and connected to an uncoated region of the electrode assembly through a lead tab; and an insulation plate provided on the uncoated region. The gasket includes a support supported by the insulation plate in a surface-contact manner, and the support forms at least one of an inner side surface and an outer side surface of a first direction and an upper surface of the insulation plate with an obtuse angle.

The gasket may further include a sealing portion coupled between the opening and the cap assembly and an extension portion extended toward the insulation plate from the sealing portion and thus connected to the support.

The sealing portion may have a first thickness, the extension portion has a second thickness, and the support may have a third thickness that is greater than the first thickness and the second thickness. The second thickness may be smaller than the first thickness.

The support may have a height set to a second direction that is perpendicular to the first direction, and the height may be set to be smaller than the third thickness.

The lead tab may penetrate the insulation plate and thus is connected to the cap assembly in the inner side surface in a space set by the height of the support.

The support may form a first angle set between the inner side surface and the insulation plate to be an obtuse angle, and may form a second angle formed between the outer side surface and the insulation plate to be an obtuse angle. The second angle may be greater than the first angle.

The case may form a beading portion concaved toward the first direction so as to be coupled with the cap assembly, and the outer side surface of the support may be inserted to a space between the beading portion and the insulation plate.

The insulation plate may be formed in the shape of a plane in the gasket side.

The insulation plate may include a plate portion formed in the electrode assembly and a protrusion protruding higher than the plate portion toward the gasket from an outer edge in the first direction.

The case may form a beading portion concaved to an inner side in the first direction so as to be coupled with the cap assembly, and the protrusion may be disposed between the electrode assembly and the beading portion.

The support may be disposed in an inner side of the protrusion in the first direction to support the plate portion.

The protrusion may be formed integrally with the plate portion.

The protrusion may be formed in the shape of a ring that is separated from the plate portion.

Another aspect is a rechargeable battery comprising: an electrode assembly having an uncoated region; a case accommodating the electrode assembly therein; an insulation plate disposed on the uncoated region of the electrode assembly; a gasket formed on the insulation plate, wherein the gasket comprises a support supported by and contacting an upper surface of the insulation plate, wherein the support comprises an inner side surface and an outer side surface, and wherein at least one of the inner and outer side surfaces forms an obtuse angle with respect to the upper surface of the insulation plate; and a cap assembly contacting the gasket and connected to the uncoated region of the electrode assembly through a lead tab.

In the above battery, the gasket further comprises i) an extension portion extending from the support toward the cap assembly and ii) a sealing portion extending from the extension portion and surrounding and contacting at least three surfaces of the cap assembly. In the above battery, the sealing portion has a first thickness, wherein the extension portion has a second thickness, and wherein the support has a third thickness that is greater than the first and second thicknesses. In the above battery, the second thickness is less than the first thickness. In the above battery, the support has a height defined in a direction extending from the upper surface of the insulating plate to the cap assembly, and wherein the height is less than the third thickness.

In the above battery, the lead tab penetrates the insulation plate and thus is connected to the cap assembly in the inner side surface in a space defined by the height of the support. In the above battery, the inner side surface of the support forms a first obtuse angle with respect to the upper surface of the insulation plate, and wherein the outer side surface of the support forms a second obtuse angle with respect to the upper surface of the insulation plate. In the above battery, the second obtuse angle is greater than the first obtuse angle. In the above battery, the case forms a beading portion formed to be inwardly concave, and wherein the outer side surface of the support is disposed in a space formed between the beading portion and the insulation plate.

In the above battery, the upper surface of the insulation plate is substantially flat. In the above battery, the upper surface of the insulation plate comprises i) a plate portion having two opposing ends and ii) a protrusion extending from the opposing ends of the plate portion toward the electrode assembly. In the above battery, the case forms a beading portion formed to be inwardly concave, and wherein the protrusion is disposed between the electrode assembly and the beading portion. In the above battery, the support is formed in an inner side of the protrusion to support the plate portion. In the above battery, the protrusion is formed integrally with the plate portion. In the above battery, the protrusion is formed in the shape of a ring that is separated from the plate portion.

Another aspect is a rechargeable battery comprising: an electrode assembly having an uncoated region; an insulation plate disposed on the uncoated region of the electrode assembly; and a gasket formed on the insulation plate, wherein the gasket comprises a support supported by and contacting an upper surface of the insulation plate, wherein the support comprises an inner side surface and an outer side surface, and wherein at least one of the inner and outer side surfaces forms an obtuse angle with respect to the upper surface of the insulation plate.

In the above battery, the gasket further comprises i) an extension portion extending from the support toward the cap assembly and ii) a sealing portion extending from the extension portion and surrounding and contacting at least three surfaces of the cap assembly. In the above battery, the sealing portion has a first thickness, wherein the extension portion has a second thickness, and wherein the support has a third thickness that is greater than the first and second thicknesses. In the above battery, the support has a height defined in a direction extending from the upper surface of the insulating plate to the cap assembly, and wherein the height is less than the third thickness.

Another aspect is a rechargeable battery comprising: an electrode assembly having an uncoated region; an insulation plate disposed on the uncoated region of the electrode assembly; a cap assembly connected to the uncoated region of the electrode assembly through a lead tab; and a gasket formed on the insulation plate, wherein the gasket comprises i) a bottom surface contacting an upper surface of the insulation plate and ii) at least one side surface extending from the bottom surface toward the cap assembly, and wherein the at least one side surface of the gasket forms an obtuse angle with respect to the upper surface of the insulation plate.

DETAILED DESCRIPTION

Figure 1:
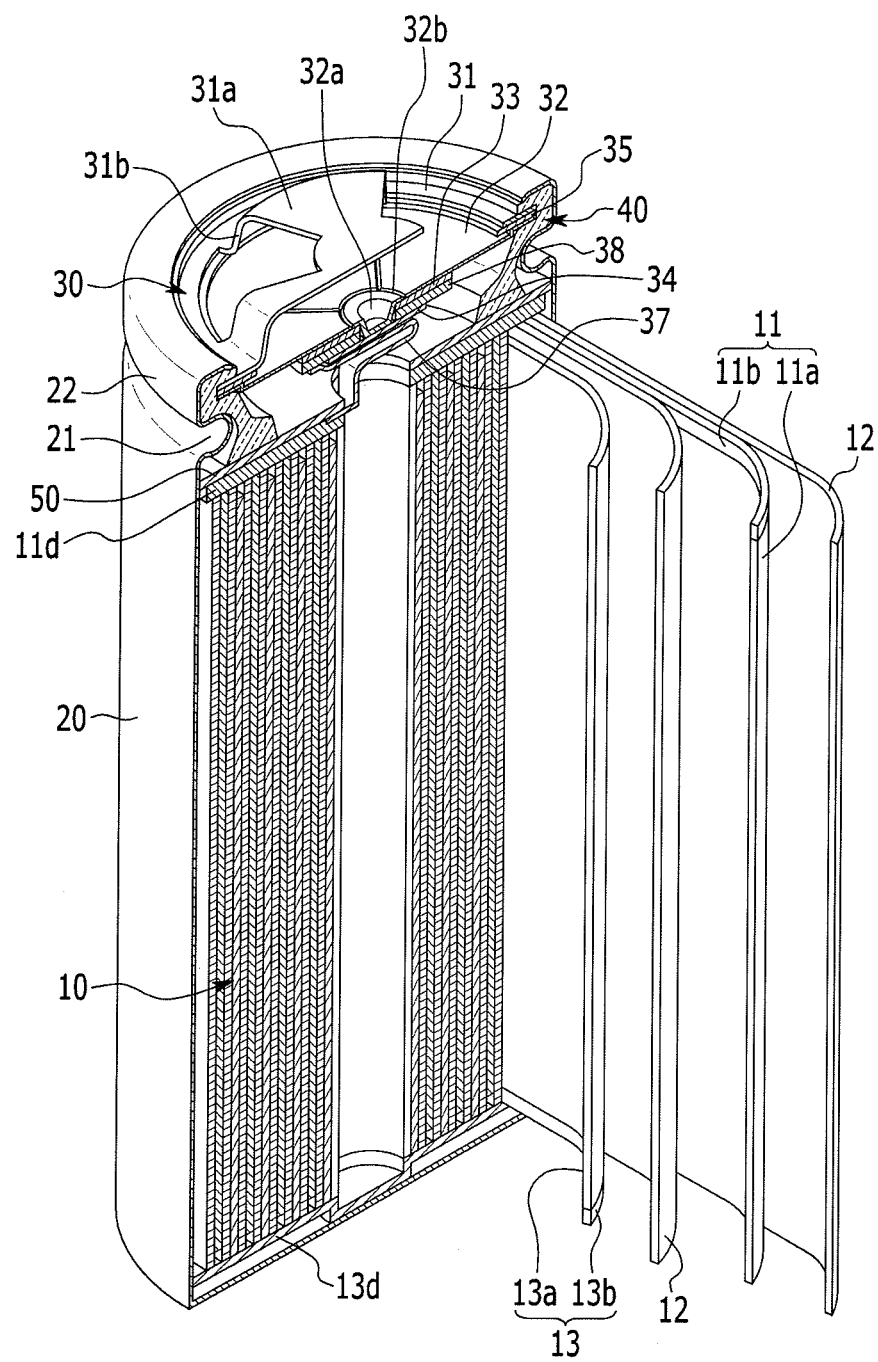
FIG. 1 is a cross-sectional view of a rechargeable battery according to a first exemplary embodiment.

Generally, a battery electrode assembly includes a coated region formed by coating an active material to a current collector and an uncoated region set by exposing the current collector at an end of the coated region, and the uncoated region is provided in later ends of a width direction of the electrode assembly. The uncoated region may be connected to a case through an electrode current collecting plate or connected to a cap assembly through the electrode current collecting plate and a lead tab.

A rechargeable battery also generally includes a lead tab between cap assemblies coupled to the electrode assembly inserted into the case, and therefore a space for prevention of short circuit due to the lead tab is required. However, the space causes movement of the electrode assembly.

Embodiments will be described more fully hereinafter with reference to the accompanying drawings. As those skilled in the art would realize, the described embodiments may be modified in various different ways, all without departing from the spirit or scope of the present invention. The drawings and description are to be regarded as illustrative in nature and not restrictive. Like reference numerals designate like elements throughout the specification.

FIG. 1 is a cross-sectional view of a rechargeable battery according to a first exemplary embodiment. Referring to FIG. 1, the rechargeable battery includes i) an electrode assembly 10 performing charging and discharging, ii) a case 20 installing the electrode assembly 10 therein, iii) a cap assembly 30 coupled to an opening of the case 20 using a gasket 40 and electrically connected to the electrode assembly 10, and iv) an insulation plate 50 provided between the cap assembly 30 and the electrode assembly 10.

The electrode assembly 10 includes a positive electrode 11, a separator 12, and a negative electrode 13 that are sequentially layered. The electrode assembly 10 is formed by winding the positive electrode 11, the negative electrode 13, and the separator 12, which is an insulator disposed between the electrodes, in a jelly roll shape.

For example, the electrode assembly 10 may be formed in the shape of a cylinder. The cylindrical electrode assembly 10 may include a sector pin in a center thereof. The sector pin maintains the shape of the electrode assembly 10 to be a cylinder.

The positive electrode 11 and the negative electrode 13 include i) coated regions 11a and 13a where an active material is coated to both sides of a current collector that is formed of a thin metal plate and ii) uncoated regions 11b and 13b where the current collector is exposed rather than being coated with the active material and set opposite ends of the positive and negative electrodes 11 and 13.

In the jelly roll state, a positive current collecting plate 11d is connected to the uncoated region 11b of the positive electrode 11 of the electrode assembly 10, and a negative electrode current collecting plate 13d is connected to the uncoated region 13b of the negative electrode 13 of the electrode assembly 10.

In one embodiment, the case 20 forms an opening in one side thereof for insertion of the electrode assembly 10 from the outside, and is formed in the shape of a cylinder to receive the cylindrical electrode assembly 10. The case 20 is connected to the negative electrode current collecting plate 13d to function as a negative terminal in the rechargeable battery, and may be formed of a conductive metal such as aluminum, an aluminum alloy, or nickel plating steel.

The cap assembly 30 is coupled to the opening of the case 20 by providing the gasket 40 therebetween and thus electrically insulated from the case 20, closes the case 20 that receives the electrode assembly 10 and an electrolyte solution, and electrically connected to the electrode assembly 10 through a current blocking device.

For example, the cap assembly 30 includes a cap plate 31, a positive temperature coefficient element (PTC) 35, a vent plate 32, an insulation member 33, a middle plate 38, and a sub-plate 34, and they are sequentially arranged toward an inside of the case 20 from an outside thereof.

In one embodiment, the cap plate 31 is eventually connected to the positive current collecting plate 11d and thus functions as a positive terminal in the rechargeable battery, and forms a protrusion 31a protruding to the outside of the case 20 and an exhaust hole 31b opened to a side direction of the protrusion 31a to exhaust an internal gas.

The current blocking device may include the vent plate 32, the sub-plate 34, and a connection portion that connects the vent plate 32 and the sub-plate 34. The connection portion may be formed by connecting the vent plate 32 and the sub-plate 34 by welding.

The vent plate 32 forming one side of the current blocking device is installed in an inner side of the cap plate 31 and thus electrically connected to the sub-plate 34 that forms the other side of the current blocking device.

In addition, the vent plate 32 includes a vent 32a which is ruptured under a predetermined pressure condition to discharge the internal gas to the environment and block the electrical connection with the sub-plate 34.

For example, the vent 32a protrudes toward an inner side of the case 20 from the vent plate 32. The vent plate 32 may include a notch 32b that guides rupture of the bent 32a in the periphery area of the vent 32a.

Thus, when an internal pressure of the case 20 is increased due to generation of gas, the notch 32b is ruptured in advance to discharge the gas to the environment through the vent plate 32 and the exhaust hole 31b to thereby prevent explosion of the rechargeable battery.

In this case, when the connection portion of the vent plate 32 and the sub-plate 34 is separated due to the rupture of the vent 32a, the electrode assembly 10 and the cap plate 31 are electrically separated from each other.

The PTC element 35 is provided between the cap plate 31 and the vent plate 32 to control a current flow between the cap plate 31 and the vent plate 32 according to an internal temperature of the rechargeable battery.

When the internal temperature exceeds a predetermined temperature, the PTC element 35 has electric resistance that increases to infinite. Accordingly, the PTC element 35 can block a charging current or a discharging current between the cap plate 31 and the vent plate 32.

The sub-plate 34 faces the vent plate 32, interposing the insulation member 33 and thus is electrically connected to the vent 32a. The middle plate 38 is disposed between the insulation member 33 and the sub-plate 34. The vent 32a protrudes through through-holes of the insulation member 33 and the middle plate 38 and thus is connected to the sub-plate 34.

Thus, the middle plate 38 is electrically connected to the sub-plate 34 and the vent 32a. In one embodiment, the middle plate 38 is connected to the lead tab 37 by welding, and the lead tab 37 is connected to the positive current collecting plate 11d by welding.

In one embodiment, the positive current collecting plate 11d is electrically connected to the cap plate 31 by sequentially via the lead tab 37, the middle plate 38, the sub-plate 34, the vent 32a, the vent plate 32, and the PTC element 35.

The insulation plate 50 is disposed between the positive current collecting plate 11d and the sub-plate 34 to electrically insulate the positive current collecting plate 11d with respect to the sub-plate 34 or the middle plate 38. The lead tab 37 is connected to the positive current collecting plate 11d and thus connected to the middle plate 38 through through-holes of the insulation plate 50.

The cap assembly 30 is fitted into the opening of the case 20 by providing the gasket 40 therebetween, and then fixed to the opening of the case 20 through a crimping process such that a rechargeable battery is formed.

In this case, the case 20 forms a beading portion 21 concaved to a center in a first direction (i.e., the diameter direction of the case) and a clamping portion 22 holding an external circumference of the cap plate 31 by providing the gasket 40 therebetween in the opening side.

Figure 2:
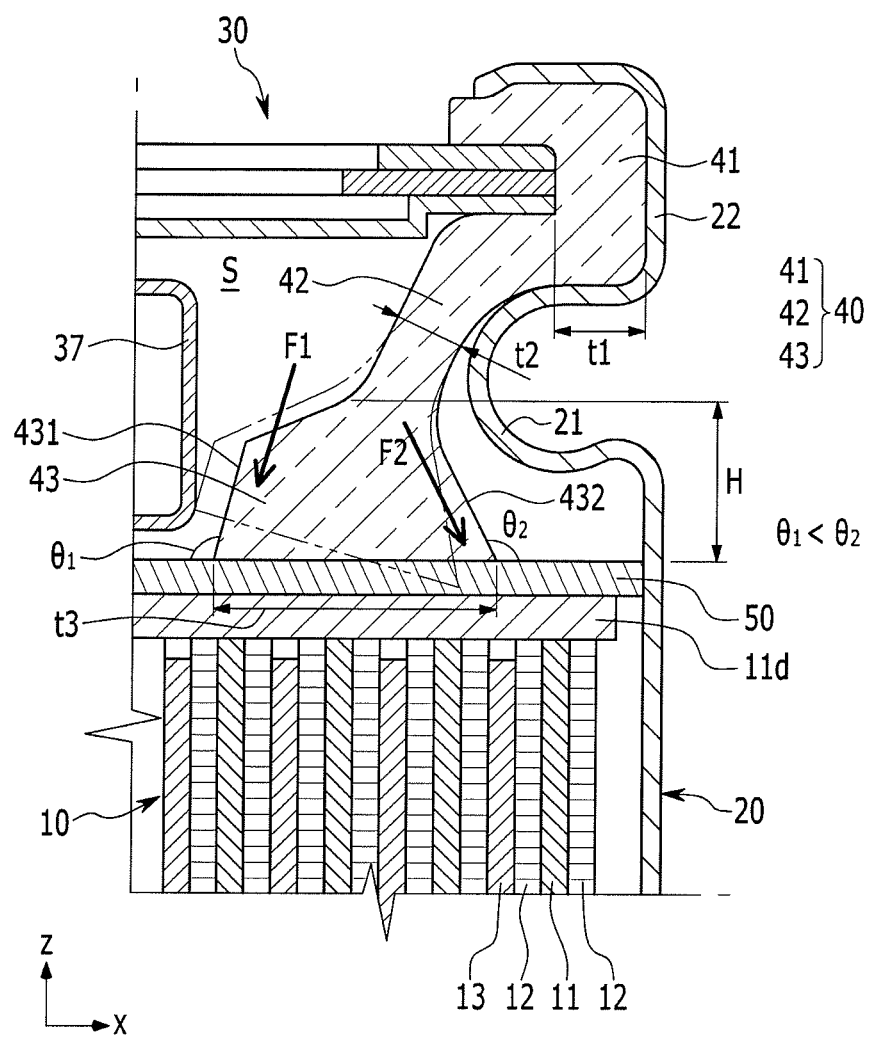
FIG. 2 is a partially enlarged cross-sectional view of a portion of the gasket in FIG. 1.

FIG. 2 is a partially enlarged cross-sectional view of the portion of the gasket of FIG. 1. Referring to FIG. 2, the gasket 40 is formed to assure an installation space of the lead tab 37 while preventing movement of the electrode assembly 10.

For example, the gasket 40 includes a support 43 surface-contacting the insulation plate 50 that is formed in the shape of a plane, a sealing portion 41 coupled between the opening of the case 20 and the cap assembly 30, and an extension portion 42 extending toward the insulation plate 50 from the sealing portion 41 and then connected to the support 43.

The sealing portion 41 has a first thickness t1, the extension portion 42 has a second thickness t2, and the support 43 has a third thickness t3. In some embodiments, the first thickness t1 is greater than the second thickness t2, and the third thickness t3 is greater than the first thickness t1 and the second thickness t2.

In some embodiments, the extension portion 42 has the smallest thickness, that is, the second thickness t2 and thus the installation space of the lead tab 37 can be assured by setting a space S defined by the gasket 40 between the insulation plate 50 and the cap assembly 30 to the maximum.

The support 43 may have the greatest thickness, that is, the third thickness t3 so that a contact area with the insulation plate 50 can be set to be the maximum, thereby stably supporting the insulation plate 50.

In some embodiments, the support 43 includes an inner side surface 431 facing the center and an outer side surface 432 facing the outside with respect to the diameter direction (i.e., the x-axis direction of FIG. 2) of the case 20. The inner side surface 431 forms a first angle θ1 with respect to an upper surface of the insulation plate 50 and the outer side surface 432 forms a second angle θ2 with respect to the upper surface of the insulation plate 50.

One or both of the first and second angles θ1 and θ2 may be an obtuse angle that is greater than 90 degrees and less than 180 degrees. In some embodiments, when one of the first angle θ1 and the second angle θ2 is an obtuse angle, the other is set to be at least a right angle.

In the present embodiment, the first angle θ1 and the second angle θ2 both are obtuse angles, and therefore the support 43 can surface-contact the insulation plate 50 with a wide area. That is, the support 43 supports the insulation plate 50 with a wider structure in the side of the insulation plate 50 than in the side of the cap assembly 30.

Meanwhile, during the crimping process, the support 43 is location-changed from an imaginary line state to a solid line state due to deformation of the extension portion 42 so that the support 43 can surface-contact the insulation plate 50 in a manner of pressing the insulation plate 50. Accordingly, strong static friction and pressure are applied between the support 43 and the insulation plate 50.

The pressure applied to the insulation plate 50 is applied to the electrode assembly 10 through the positive current collecting plate 11d such that the electrode assembly 10 is closely attached to the opposite side of the opening in the case 20. Thus, the movement of the electrode assembly 10 in the case 20 can be prevented.

In this case, the first angle θ1 and the second angle θ2 form the obtuse angles, and therefore the support 43 can further apply first and second pressure forces F1 and F2 (see FIG. 2) to directions of the first angle θ1 and the second angle θ2 with respect to the upper surface of the insulation plate 50. Accordingly, movement of the electrode assembly 10 can further be prevented.

In some embodiments, since the second angle θ2 is greater than the first angle θ1, the outer side surface 432 of the support 43 is inserted into a space between the beading portion 21 and the insulation plate 50. Thus, the support 43 can effectively support the insulation plate 50 through the center and external sides thereof.

In addition, the support 43 has a height H measured in a second direction (i.e., z-axis direction) that is substantially perpendicular to the first direction. The height H may be smaller than the third thickness t3 so that the pressure transferred through the extension portion 42 can be effectively transmitted to the insulation plate 50 while providing a sufficient dimension of the space S.

Since the support 43 has the height H, the space S defined between the insulation plate 50 and the cap assembly 30 by the gasket 40 can be further extended to the z-axis direction, thereby effectively assuring the installation space S of the lead tab 37.

The extension portion 42 and the support 43 define the space S in the diameter direction (x-axis direction) and the height direction (z-axis direction). The extension portion 42 can extend the space S to the diameter direction (x-axis direction) by reducing the second thickness t2, and the support 43 can minimize, by decreasing the height H, a reduction in the dimension of the space S defined by the extension portion 42. That is, the space S having a dimension sufficient for the lead tab 37 can be provided.

The lead tab 37 penetrates the insulation plate 50 (see FIG. 1) and then is connected to the middle plate 38 of the cap assembly 40 in the inner side surface 431 of the space S defined in the z-axis direction and the x-axis direction by the height H of the support 43 and the extension portion 42.

Hereinafter, various exemplary embodiments will be described and the duplication description for the same configuration as the first exemplary embodiment and the above-described exemplary embodiment will be omitted.

Figure 3:
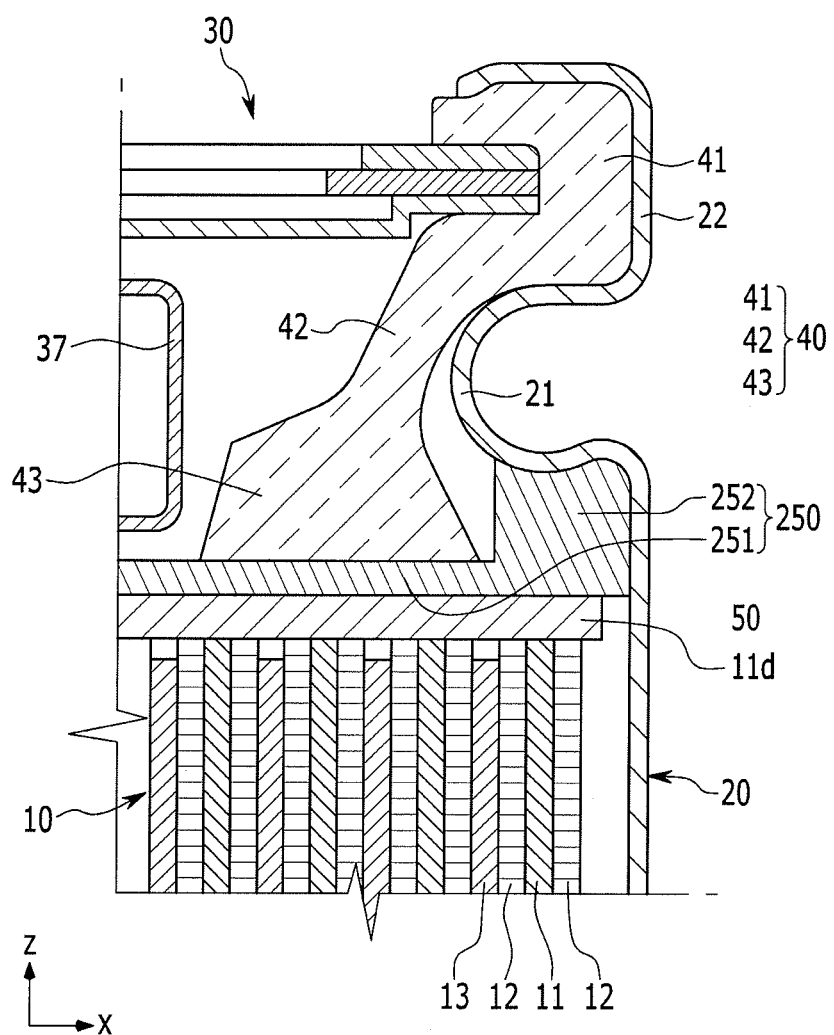
FIG. 3 is a partial cross-sectional view of a rechargeable battery according to a second exemplary embodiment.

In one embodiment, as shown in FIG. 3, an insulation plate 250 includes a plate portion 251 formed in an electrode assembly 10 and a protrusion 252 protruding toward a gasket 40 to be higher than the plate portion 251 from an outer edge of a first direction.

The plate portion 251 is supported between a positive current collecting plate 11d and a support 43, and the protrusion 252 is compressed by a beading portion 21 between the current collecting plate 11d connected to the electrode assembly 10 and the beading portion 21. In this case, the support 43 supports the plate portion 251 in a manner of pressing the same from an inner side of the protrusion 252.

Thus, the insulation plate 250 is supported by the support 43 and the beading portion 21 and thus presses the positive current collecting plate 11d toward the electrode assembly 10 such that the electrode assembly 10 can be closely attached to the opposite side of the opening of the case 20. That is, movement of the electrode assembly 10 during vibration.

Figure 4:
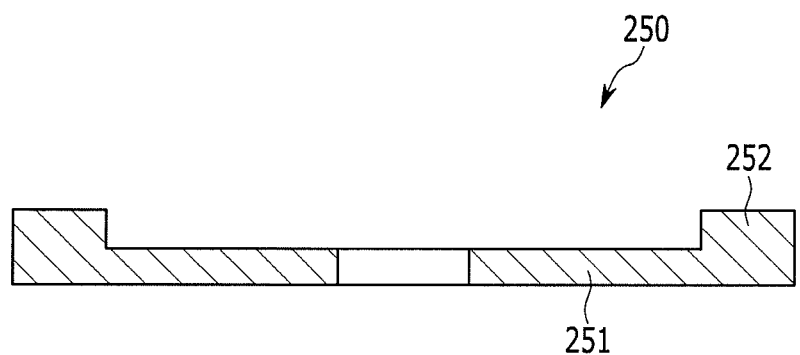
FIG. 4 is a cross-sectional view of an insulation plate applied to the rechargeable battery of FIG. 3.

FIG. 4 is a cross-sectional view of the insulation plate 250 applied to FIG. 3. In one embodiment, as shown in FIG. 4, the protrusion 252 is integrally formed with the plate portion 251. An insulation plate 250 integrally forming the protrusion 252 and the plate portion 251 does not need an additional process during assembling.

Figure 5:
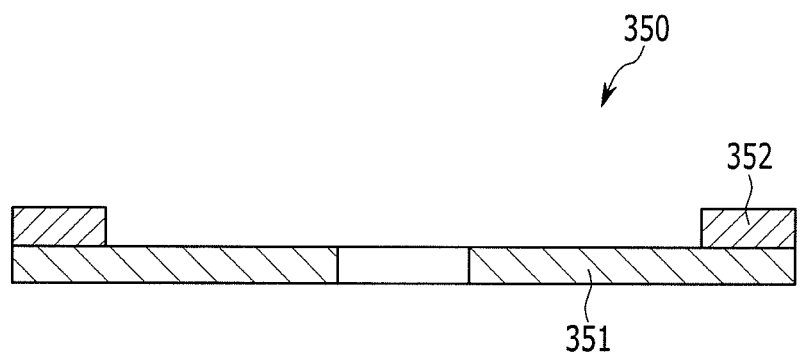
FIG. 5 is a cross-sectional view of an insulation plate applied to a rechargeable battery according to a third exemplary embodiment.

FIG. 5 is a cross-sectional view of an insulation plate 350 applied to a rechargeable battery according to a third exemplary embodiment. In one embodiment, as shown in FIG. 5, a protrusion 352 is formed in the shape of a ring that can be separated from a plate portion 351 and disposed in an outer edge of the plate portion 351.

The protrusion 351 and an external circumference of the plate 351 corresponding thereto are disposed between the beading portion 21 and the electrode assembly 10. The insulation plate 350 that separates the protrusion 352 and the plate portion 351 ease a processing process. The protrusion 352 and the plate portion 351 may be used in a state of being attached to each other by an adhesive or in a state of being separated.

According to at least one of the disclosed embodiments, one side of the gasket support forms an obtuse angle with respect to an upper surface of the insulation plate so that the insulation plate can be stably supported by the support in a manner of surface-contact, and accordingly movement of the electrode assembly between the case and the cap assembly can be prevented.

In addition, a sufficient internal space is provided between the electrode assembly and the cap assembly so that an installation space of the lead tab that connects the electrode assembly and the cap assembly can be assured.

While the above embodiments have been described in connection with the accompanying drawings, it is to be understood that the invention is not limited to the disclosed embodiments, but, on the contrary, is intended to cover various modifications and equivalent arrangements included within the spirit and scope of the appended claims.

What is claimed is:

1. A rechargeable battery comprising:
   an electrode assembly having an uncoated region;
   a case accommodating the electrode assembly therein;
   an insulation plate disposed on the uncoated region of the electrode assembly;
   a gasket formed on the insulation plate, wherein the gasket comprises a support supported by and contacting an upper surface of the insulation plate, wherein the support comprises an inner side surface and an outer side surface, and wherein at least one of the inner and outer side surfaces forms an obtuse angle with respect to the upper surface of the insulation plate; and
   a cap assembly contacting the gasket and connected to the uncoated region of the electrode assembly through a lead tab.

2. The rechargeable battery of claim 1, wherein the gasket further comprises i) an extension portion extending from the support toward the cap assembly and ii) a sealing portion extending from the extension portion and surrounding and contacting at least three surfaces of the cap assembly.

3. The rechargeable battery of claim 2, wherein the sealing portion has a first thickness, wherein the extension portion has a second thickness, and wherein the support has a third thickness that is greater than the first and second thicknesses.

4. The rechargeable battery of claim 3, wherein the second thickness is less than the first thickness.

5. The rechargeable battery of claim 2, wherein the support has a height defined in a direction extending from the upper surface of the insulating plate to the cap assembly, and wherein the height is less than the third thickness.

6. The rechargeable battery of claim 5, wherein the lead tab penetrates the insulation plate and thus is connected to the cap assembly in the inner side surface in a space defined by the height of the support.

7. The rechargeable battery of claim 1, wherein the inner side surface of the support forms a first obtuse angle with respect to the upper surface of the insulation plate, and wherein the outer side surface of the support forms a second obtuse angle with respect to the upper surface of the insulation plate.

8. The rechargeable battery of claim 7, wherein the second obtuse angle is greater than the first obtuse angle.

9. The rechargeable battery of claim 8, wherein the case forms a beading portion formed to be inwardly concave, and wherein the outer side surface of the support is disposed in a space formed between the beading portion and the insulation plate.

10. The rechargeable battery of claim 1, wherein the upper surface of the insulation plate is substantially flat.

11. The rechargeable battery of claim 1, wherein the upper surface of the insulation plate comprises i) a plate portion having two opposing ends and ii) a protrusion extending from the opposing ends of the plate portion toward the electrode assembly.

12. The rechargeable battery of claim 11, wherein the case forms a beading portion formed to be inwardly concave, and wherein the protrusion is disposed between the electrode assembly and the beading portion.

13. The rechargeable battery of claim 12, wherein the support is formed in an inner side of the protrusion to support the plate portion.

14. The rechargeable battery of claim 11, wherein the protrusion is formed integrally with the plate portion.

15. The rechargeable battery of claim 11, wherein the protrusion is formed in the shape of a ring that is separated from the plate portion.

16. A rechargeable battery comprising:
an electrode assembly having an uncoated region;
an insulation plate disposed on the uncoated region of the electrode assembly; and
a gasket formed on the insulation plate, wherein the gasket comprises a support supported by and contacting an upper surface of the insulation plate, wherein the support comprises an inner side surface and an outer side surface, and wherein at least one of the inner and outer side surfaces forms an obtuse angle with respect to the upper surface of the insulation plate.

17. The rechargeable battery of claim 16, wherein the gasket further comprises i) an extension portion extending from the support toward the cap assembly and ii) a sealing portion extending from the extension portion and surrounding and contacting at least three surfaces of the cap assembly.

18. The rechargeable battery of claim 17, wherein the sealing portion has a first thickness, wherein the extension portion has a second thickness, and wherein the support has a third thickness that is greater than the first and second thicknesses.

19. The rechargeable battery of claim 18, wherein the support has a height defined in a direction extending from the upper surface of the insulating plate to the cap assembly, and wherein the height is less than the third thickness.

20. A rechargeable battery comprising:
an electrode assembly having an uncoated region;
an insulation plate disposed on the uncoated region of the electrode assembly;
a cap assembly connected to the uncoated region of the electrode assembly through a lead tab; and
a gasket formed on the insulation plate, wherein the gasket comprises i) a bottom surface contacting an upper surface of the insulation plate and ii) at least one side surface extending from the bottom surface toward the cap assembly, and wherein the at least one side surface of the gasket forms an obtuse angle with respect to the upper surface of the insulation plate.

* * * * *